Patented May 3, 1932

1,856,880

UNITED STATES PATENT OFFICE

LINDLEY E. MILLS AND HENRY S. GOODWIN, OF MIDLAND, MICHIGAN ASSIGNORS TO THE DOW CHEMICAL COMPANY, OF MIDLAND, MICHIGAN, A CORPORATION OF MICHIGAN

ESTERS OF SALICYLIC ACID

No Drawing. Application filed June 8, 1931. Serial No. 543,018.

The invention relates to certain new esters of salicylic acid of the type of phenyl salicylate, commonly called salol, which have valuable medicinal properties as intestinal antiseptics and for other uses.

The effectiveness of salol has been found to result from its gradual hydrolysis in the intestines, thereby liberating phenol and salicylic acid. Our new compounds, which are the diphenyl esters of salicylic acid, having the general formula:

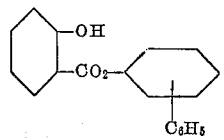

are capable of undergoing hydrolysis similarly, resulting in the gradual liberation of the corresponding phenylphenols having a much higher phenol coefficient than has phenol itself and also being less toxic than is phenol. The invention, then, consists in the new compounds, together with the methods of preparing the same, hereinafter fully described and particularly pointed out in the claims.

Our new compounds may be prepared by any of the usual methods for esterifying a carboxylic acid with a phenol, but preferably by reacting salicylic acid with a phenylphenol in the presence of phosphorus oxychloride.

Certain ways of applying the principle of our invention are described in the following examples, it being understood, however, that such examples are purely illustrative and are not to be construed as a limitation on the invention.

Example 1

Ortho - phenylphenylsalicylate, having probably the formula:

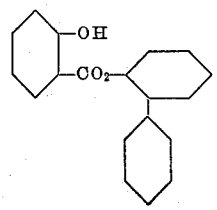

was prepared in the following way:—Into a three-neck flask, equipped with a stirrer, thermometer, condenser and dropping funnel, were placed 170 grams (1 mole) of orthophenylphenol and 138 grams (1 mole) of salicylic acid. The temperature of the reaction mixture was brought to 110° C., and 85 grams (0.55 mole) of phosphorus oxychloride added slowly and with stirring. Copius fumes of hydrochloric acid were evolved during the reaction. The mixture was stirred and maintained at a temperature of 110° to 120° C. for a period of one hour. The solution was then poured into water, mixed thoroughly, allowed to settle, and the mixture decanted. The residue was washed successively with water, 5 per cent sodium carbonate solution and again with water. The solid product was then dried and crystallized from methyl alcohol. There was obtained 205 grams of white flaky crystals having a melting point of approximately 90.5° C. The yield was practically 71 per cent theoretical.

Example 2

Meta - phenylphenylsalicylate, having probably the formula:

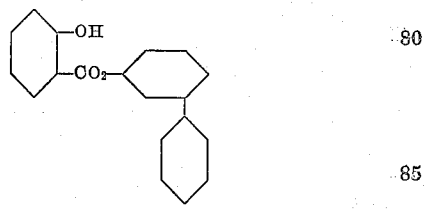

was prepared by melting 85 grams (0.5 mole) of meta-phenylphenol in a 2-liter, 3-necked flask, equipped as described in Example 1. To this melt 67.5 grams (0.5 mole) of salicylic acid was added with stirring and the mixture was heated to a temperature of 110° C. At this point 42.5 grams (0.275 mole) of phosphorus oxychloride was added in a slow stream by means of the dropping funnel. Stirring was continued and an average temperature, 75° to 85° C., maintained during a period of about 4 hours, (i. e. until hydrogen chloride ceased to be evolved). The reaction mass was poured into hot water with vigorous stirring. Upon slow cooling while continuing the stirring, a white, paste-like oil separated. This was washed first with water, then with sodium carbonate solution, then again with distilled water, and finally, it was dried. There was obtained 139 grams of product or approximately 99 per cent of a theoretical yield. The product, after recrystallization from ethyl alcohol, was found to have a melting point of approximately 54.5° C.

*Example 3*

Para - phenyl - phenylsalicylate, having probably the formula:

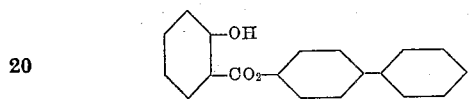

was prepared by reacting para-phenylphenol with salicylic acid, in the presence of phosphorus oxychloride, according to procedure similar to that described in Example 1, except that in the present instance the mixture was maintained at a temperature of approximately 90° to 100° C. during the reaction. There was obtained 300 grams of white flaky product having a melting point of approximately 109.5° C.

Other modes of applying the principle of our invention may be employed instead of the one explained, change being made as regards the process herein disclosed, provided the step or steps stated by any of the following claims or the equivalent of such stated step or steps be employed.

We therefore particularly point out and distinctly claim as our invention:—

1. In a method for making an ester of salicylic acid having the general formula:

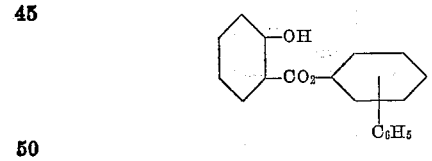

the step which consists in esterifying salicylic acid with a phenylphenol.

2. In a method for making an ester of salicylic acid having the general formula:

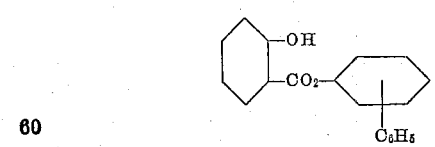

the step which consists in esterifying salicylic acid, using phosphorus oxychloride as an esterifying agent, with a phenylphenol.

3. In a method for making an ester of salicylic acid having probably the formula;

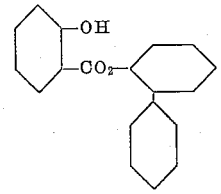

the step which consists in esterifying salicylic acid with orthophenylphenol.

4. In a method for making an ester of salicylic acid having probably the formula:

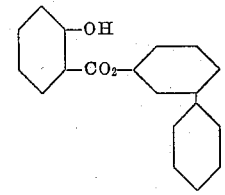

the step which consists in esterifying salicylic acid with meta-phenylphenol.

5. In a method for making an ester of salicylic acid having probably the formula:

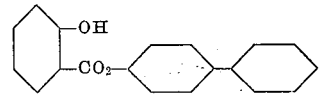

the step which consists in esterifying salicylic acid with para-phenylphenol.

6. As a new compound, a diphenyl-salicylate having the general formula:

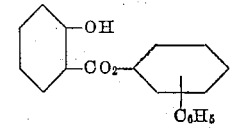

7. As a new compound, ortho-phenylphenylsalicylate having probably the formula:

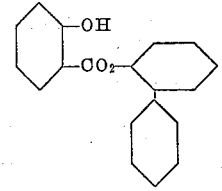

and having a melting point of approximately 90.5° C.

8. As a new compound, meta-phenylphenylsalicylate having probably the formula:

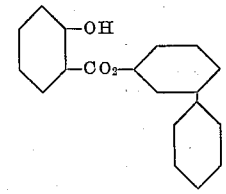

and having a melting point of approximately 54.5° C.

9. As a new compound, para-phenylphenylsalicylate having probably the formula:
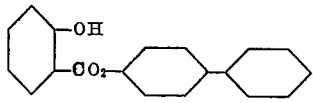
and having a melting point of approximately 109.5° C.
Signed by us this 28th day of May, 1931.
LINDLEY E. MILLS.
HENRY S. GOODWIN.